March 7, 1939. W. MÜLLER 2,149,540
PARACHUTE
Filed Oct. 27, 1934 2 Sheets-Sheet 2
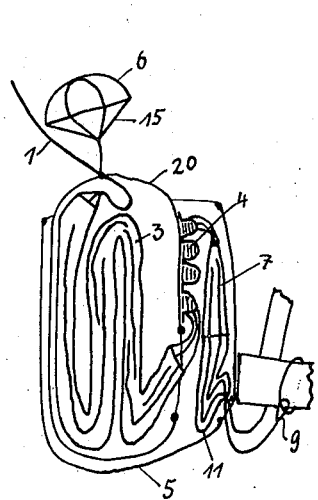
Fig. 8.
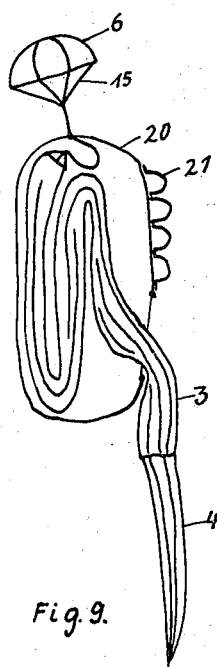
Fig. 9.
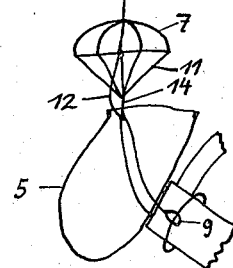
INVENTOR
Waldemar Müller
BY B. Singer
ATTORNEY Patented Mar. 7, 1939

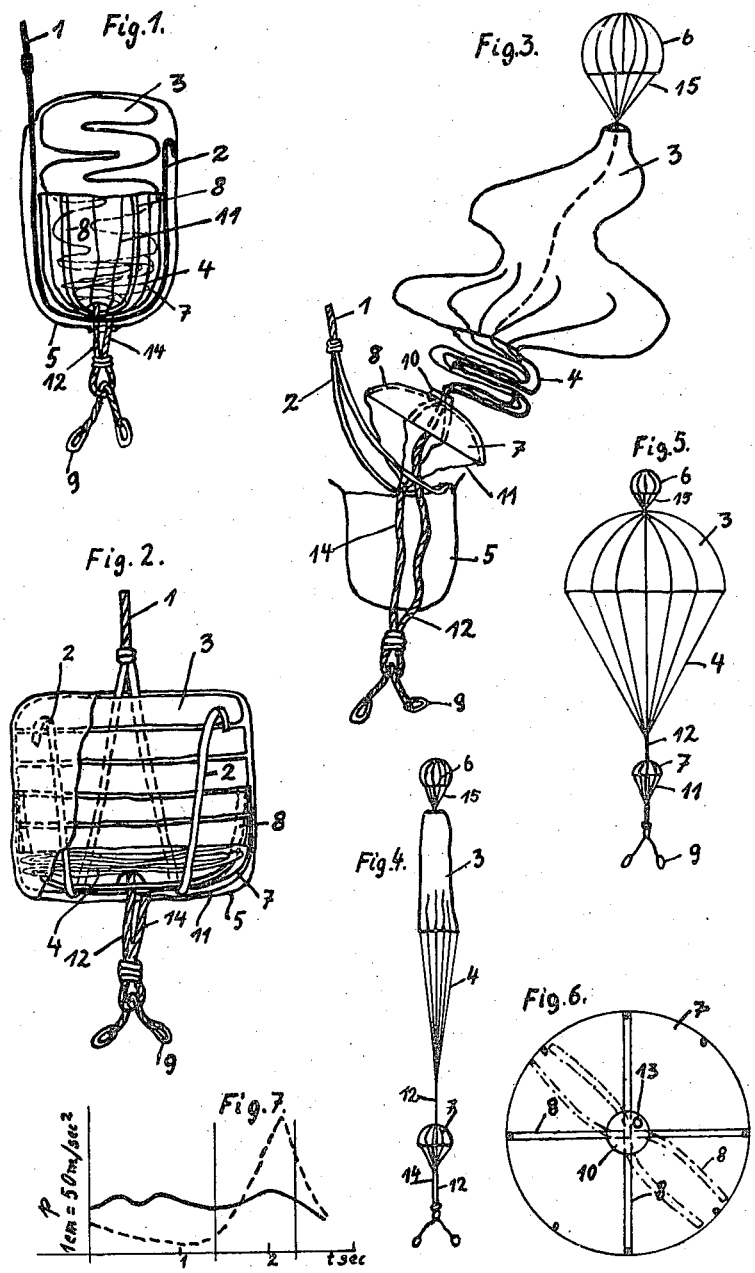

2,149,540

UNITED STATES PATENT OFFICE 2,149,540

PARACHUTE

Waldemar Müller, Berlin-Spandau, Germany

Application October 27, 1934, Serial No. 750,355
In Germany July 12, 1933

6 Claims. (Cl. 244—142)

This invention relates to parachutes designed to provide a safe means of descent to the ground of the occupants of aeroplanes or other aircraft when the latter has to be abandoned in flight.

Such parachutes have already been designed for attachment to masses having a starting velocity exceeding 50 meters per second and comprising two parachute members each directly connected with the load and adapted to freely unfold independently of one another. The object of the invention is to provide an improved parachute of this kind.

My invention consists of a large main parachute, known per se and designed to have a predetermined velocity of fall of about from 5 to 8 meters per second, and also of a small auxiliary parachute connected to the main parachute and acting as a braking parachute and adapted to freely unfold independently of the main parachute, the auxiliary parachute being of less than $\frac{1}{20}$ and more than $\frac{1}{60}$ of the surface of the main parachute and of a preferably stronger envelope material than the main parachute, and provided with a set of cords or lines connected to the ropes suspending the load and having a combined strength corresponding to at least five to ten times the load.

If the two parachutes are simultaneously exposed to the free air current, then owing to its small volume the small parachute opens first in a fraction of a second (after about 5 to 10 meters passage through the air) and brakes the greater part of the vis viva inherent in the load, until, after about 80 meters of the unfolding path, the main parachute begins to unfold. The shock of unfolding of the main parachute is therefore very small, particularly, when this parachute has a large volume. With such parachutes, therefore, with starting velocities of 100 meters per second and more, men can be held up without danger. With large loads, for example entire aeroplanes and correspondingly larger parachutes, the starting velocities can be further increased.

An advantageous constructional form is produced by making the small parachute which is to be unfolded first so small that its air-resistance when fully unfolded and at the highest flying speed (falling flight) attains a maximum of about 5 to 10 times the load to be carried by it, for example, for parachutes for a man, a maximum of about 800 kg. This corresponds to about the maximum retardation which can be endured by a man.

A particularly convenient constructional form is produced by arranging the auxiliary parachute between the connection point of the rope of the main parachute and the load, whereby the thick rope necessary for the auxiliary parachute may be short and therefore light, and for this purpose the life lines of the main parachute may partly be utilized. The auxiliary parachute is besides not covered by the main parachute as it opens.

In addition to this auxiliary parachute an additional parachute serving for the extension of the main parachute and for further braking can be arranged on the top of the main parachute, the tractive force of the additional parachute being transmitted preferably by a strong central rope directly to the load. With this arrangement the braking parachute arranged below the main parachute is in some cases opened by spring power directly after the opening of the parachute packing and therefore earlier than the additional parachute.

The parachute can also be packed in a sack connected with the aircraft by means of strong ropes, which sack is adapted to be released by the men by means of the rope and withdrawn upwardly from the parachute.

The invention is illustrated in two constructional forms in the accompanying drawings, in which:

Fig. 1 is a lateral view in section as seen from one side of a parachute-holder, together with the parachute;

Fig. 2 is a rear view of the same, partly in section;

Fig. 3 shows the parachute after the ejection from the packing at the beginning of the unfolding;

Fig. 4 shows the parachute in extended condition;

Fig. 5 shows the completely unfolded parachute;

Fig. 6 is a plan view of the lower auxiliary parachute;

Fig. 7 is a retardation diagram;

Figs. 8 and 9 illustrate another way of packing the parachute.

Referring to Figs. 1 to 6 of the drawings, the invention consists of a main parachute 3 with ropes 4 and life line 12, which is connected at the lower end with the suspending ropes 9 holding the man. The invention consists further, of a lower auxiliary parachute 7 with ropes 11 and life line 14, which is connected with the life line 12, and further of an auxiliary parachute 6 arranged on the top of the main parachute 3 with cords 15 which are connected by a strong central rope with the life line 12 or directly with the belt of the man with whom the suspension ropes 9 engage.

The parachute 7, serving for a braking parachute, contains on its summit a disc 10 of wood, metal or the like to which two springbands 8 crossing one another at right angles are secured which are sewn to the parachute material so that they tend to expand the latter. In the folded up condition the springs 8 can be laid together as shown in dotted lines in Fig. 6. The disc 10 also has a hole 13 through which the life line 12 is passed.

A parachute holder 5 fixed to the belt of the man is provided at its upper end with a needle or running closure in the usual manner, which is adapted to be run open by a release line 1 of about 6 to 10 meters length fixed to the aircraft. The release line 1 runs to the lower end in two branched ropes 2 known per se, which within the container surround the parachute packed therein harmonica like in the usual manner and are fixed at their ends to the container 5 by thin yarn. The life lines 12 and 14 are led outwardly through a bottom opening of the container 5, and are secured to the belt of the man by means of suspension ropes 9.

On the man leaping the rope 1 first opens the container 5 and then ejects the parachute, together with the two auxiliary parachutes, out of the packing and then runs out from the container 5. Then the braking parachute 7 opens first due to its small volume and under the action of the springs 8, and according to Fig. 7 it applies a braking force during the first one and a half up to two seconds and takes up a great part of the vis viva of the man (see the full line of the diagram Fig. 7, in which $\rho$=retardation in m/sec.$^2$ and $t$=time after the leap in seconds) During this time the main parachute is extended (according to Fig. 4) by the auxiliary parachute 6, the parachute 6 then also retards, until the parachute 3 is fully unfolded in the course of the next few seconds, so that the parachute 6 is gradually covered and becomes inoperative. The retardation occurs somewhat as represented in Fig. 7 in the full line, while the retardation with a normal parachute occurs somewhat as shown by the dotted line. The smaller the parachute 7 or 6 and therewith the larger the parachute 3 is, the smaller become the retardations and the greater the unfolding path. With suitable size of the separate parachutes the effect produced by any desired starting speed of the parachute can be rendered harmless.

Parachute 6 has preferably a larger volume but smaller cross-section of opening than parachute 7, so that it opens later and more softly than the latter. It may therefore be formed with advantage as two-thirds of a sphere or like a flexible hose.

Instead of the two parachutes 6 and 7 only one of the two may be made use of. In this case parachute 7 is to be preferred, as it never comes into the wind-shadow of the parachute 3, and its thick rope only requires to be short. Moreover the parachute 6 only can be used as a retarding device.

The packed parachute can also be arranged in a separate container fixed on the belt of the man and adapted to be opened by releasing line 1 or a hand line.

The parachute 3 (see Figs. 8 and 9) together with the lines 4 may be advantageously packed in or on an auxiliary sack 20, which is arranged in the main packing 5 and is withdrawn by the auxiliary parachute 6, 15 or the releasing line 1, from the packing. In this embodiment of the invention the ropes 4 are passed into loops 21 which are sewn outwardly upon the auxiliary sack. In this way the entire parachute is progressively extended from below, thus from the ropes 12, 14 and from the parachute 7 upwardly, whereby the parachute 3, 4 is gradually withdrawn and without shock from the auxiliary sack 20. When the releasing line 1 is employed to withdraw the auxiliary sack 20 from the packing 5, then the line 1 is to be connected to the sack 20, and not to the top of the main parachute 3.

I claim:

1. A parachute apparatus comprising a large main parachute with a set of main shroud lines and ropes suspending the load, a first small auxiliary parachute with a separate set of shroud cords arranged co-axially below the lower mutual connection point of the main shroud lines and connected to the load, and a second additional small auxiliary parachute with a separate set of shroud cords arranged over the top of the main parachute.

2. A parachute apparatus comprising a large main parachute with a set of main shroud lines and ropes suspending the load, a first small auxiliary parachute with a separate set of shroud cords arranged co-axially below the lower mutual connection point of the main shroud lines and connected to the load, and a second additional small auxiliary parachute with a separate set of shroud cords arranged over the top of the main parachute, each of said auxiliary parachutes and their shroud cords having a strength of at least five times the weight of the load and an area of at most a twentieth the area of the main parachute.

3. A parachute apparatus comprising a large main parachute with a set of main shroud lines and ropes suspending the load, a first small auxiliary parachute with a separate set of shroud cords arranged co-axially below the lower mutual connection point of the main shroud lines and connected to the load, and a second additional small auxiliary parachute with a separate set of shroud cords arranged over the top of the main parachute, said second additional parachute having a greater volume and smaller cross-section of opening than the first auxiliary parachute.

4. A parachute apparatus according to claim 1, wherein a special auxiliary sack adapted to be packed loosely in a main packing is provided and the main parachute together with the main shroud lines is packed separately by means of said special auxiliary sack fastened to the cords of the top parachute being packed outwardly of the auxiliary sack whereby during unfolding the lower auxiliary parachute and the main parachute are progressively extended from below.

5. A parachute apparatus, comprising two independently freely unfoldable parachutes, one of which is a main parachute and the other an auxiliary parachute, said main parachute being of relatively great size and being constructed to assure the desired descending speed of about five to eight meters per second, said auxiliary parachute serving as a brake parachute and constructed to be opened independently of the main parachute and having less than one-twentieth the area of the main parachute, cords extending from the auxiliary parachute to the top of the main parachute, said cords having a total strength of at least five times the weight of the load, a main packing, and a special auxiliary sack fastened to the cords of said top parachute and being adapted to be packed loosely in said main packing, said main parachute together with the main shroud lines being packed separately by means of said auxiliary sack, said top parachute being packed outwardly of said auxiliary sack in said main packing.

6. A parachute apparatus adapted to brake a load moved at a starting speed exceeding fifty meters per second, comprising a large main parachute with a set of main shroud lines and ropes suspending the load, said main parachute being of a size to ensure the desired landing speed, and a small auxiliary parachute connected to the main parachute and serving as a braking parachute and adapted to freely unfold independently of the main parachute, said auxiliary parachute having an area of a twentieth to a ninetieth of the area of the main parachute and having a separate set of cords arranged around the margin of its canopy and connected to the ropes suspending the load, said set of cords and its connection to the load having a total strength of at least five times the weight of the load, a special auxiliary sack fastened to a cord of the airplane is provided in a main packing and the main parachute together with the main shroud lines is packed separately by means of said special auxiliary sack, whereby during unfolding the auxiliary parachute and the main parachute are progressively extended from below.

WALDEMAR MÜLLER.